United States Patent [19]
Keating et al.

[11] Patent Number: 5,446,497
[45] Date of Patent: Aug. 29, 1995

[54] METHOD AND APPARATUS FOR PROCESSING AN INPUT 60 FIELD/SECOND VIDEO SIGNAL GENERATED BY 3232 PULLDOWN TO PRODUCE AN OUTPUT VIDEO SIGNAL

[75] Inventors: Stephen M. Keating, Reading; John W. Richards, Stockbridge, both of United Kingdom

[73] Assignee: Sony United Kingdom Ltd., Staines, England

[21] Appl. No.: 129,360

[22] Filed: Sep. 30, 1993

[30] Foreign Application Priority Data

Nov. 17, 1992 [GB] United Kingdom ............ 9224056

[51] Int. Cl.6 .............................................. H04N 7/01
[52] U.S. Cl. ................................. 348/443; 348/452; 348/911
[58] Field of Search ................. 358/140, 11, 105, 214, 358/54, 141, 12, 185; H04N 7/01, 11/20; 348/452, 451, 448, 441, 459, 911, 443, 446, 449, 458, 441, 700, 701, 699, 96, 97, 722, 444

[56] References Cited

U.S. PATENT DOCUMENTS

| | | | |
|---|---|---|---|
| 5,115,311 | 5/1992 | Jaqua | 358/140 |
| 5,181,111 | 1/1993 | Hedley et al. | 358/140 |
| 5,191,427 | 3/1993 | Richards et al. | 358/214 |
| 5,221,966 | 6/1993 | Clayton et al. | 358/140 |
| 5,255,091 | 10/1993 | Lyon et al. | 358/140 |

FOREIGN PATENT DOCUMENTS

WO91/06182  5/1991  WIPO ............ H04N 7/01

OTHER PUBLICATIONS

Lamnabhi, et al., "Advanced High-Definition 50 to 60-Hz Standards Conversion", SMPTE Journal, Jun. 1989, pp. 420–424.

*Primary Examiner*—James J. Groody
*Assistant Examiner*—Safet Metjahic
*Attorney, Agent, or Firm*—William S. Frommer; Alvin Sinderbrand

[57] ABSTRACT

A method of processing an input 60 field/s video signal generated by 3232 pulldown to produce an output video signal, comprises producing from the input signal a series of progressive scan format frames, each frame corresponding to a respective one of the input fields, and comparing blocks of pixels in each progressive scan frame with blocks of pixels in the following frame to derive motion vectors representing the motion of the content of respective blocks between frames. The motion vectors are utilized to monitor the field sequence of the input signal, and fields or frames of the output video signal are produced using input fields or progressive scan frames selected in dependence upon the field sequence of the input signal, at least some of the output fields or frames being produced by motion compensated temporal interpolation utilizing the motion vectors.

9 Claims, 9 Drawing Sheets

| Count of Mod-3 Counter 28 | 2 | 2 | 0 | 0 | 1 | 1 | 2 | 2 | 0 | 0 | 1 | 1 | 2 | 2 | 0 |
|---|---|---|---|---|---|---|---|---|---|---|---|---|---|---|---|
| Write | 2 |  | 0 |  | 1 |  | 2 |  | 0 |  | 1 |  | 2 |  | 0 |
| Count of Mod-3 Counter 31 | 2 |  | 0 |  | 1 |  | 2 |  | 0 |  | 1 |  | 2 |  | 0 |
| Count of Counter 31 Sampled at 50Hz | 2 | 2 | 0 | 0 | 1 | 1 | 2 | 2 | 0 | 0 | 1 | 1 | 2 | 2 | 0 |
| Delayed Sampled Count (CA) | 2 | 2 | 0 | 0 | 1 | 1 | 2 | 2 | 0 | 0 | 1 | 1 | 2 |  |  |
| CA, CB | 2,0 | 2,0 | 0,1 | 0,1 | 1,2 | 1,2 | 2,0 | 2,0 | 0,1 | 0,1 | 1,2 | 1,2 | 2,0 |  |  |
| I(A:B) | 0.36 | 0.84 | 0.32 | 0.80 | 0.28 | 0.76 | 0.24 | 0.72 | 0.20 | 0.68 | 0.16 | 0.64 | 0.12 |  |  |

*FIGURE 9*

METHOD AND APPARATUS FOR PROCESSING AN INPUT 60 FIELD/SECOND VIDEO SIGNAL GENERATED BY 3232 PULLDOWN TO PRODUCE AN OUTPUT VIDEO SIGNAL

BACKGROUND OF THE INVENTION

1. Field of the Invention

This invention relates to processing of 60 Hz 3232 pulldown format video signals.

2. Description of the Prior Art

24 Hz (24 frames/s) film is commonly converted to 60 Hz (60 fields/s) video using a technique known as 3232 pulldown. This technique is illustrated in FIG. 1 of the accompanying drawings which shows the relationship between the 24 Hz film frames, numbered 1, 2, 3 etc in the figure, and the 60 Hz video fields derived therefrom. Five video fields are produced from each successive pair of film frames as indicated by the arrows in the figure. Firstly, an odd video field 1O is generated by scanning every other line in film frame 1. An even field 1E is then generated by scanning the alternate lines in film frame 1. The odd field 1O is then repeated. An even field 2E and an odd field 2O are then derived from film frame 2 to complete the five field sequence. This process is theft repeated for film frames 3 and 4, but in this case the sequence starts with an even field 3E to maintain the alternating odd and even field sequence, and this even field 3E is repeated. Film frames 5 and 6 are converted in the same manner as frames 1 and 2, and so on. As indicated in the figure, the resulting 60 Hz video signal consists of successive groups of 3 and 2 video fields, the fields in each group being derived from the same frame of film, and one field in each group of three being repeated.

Such 24 Hz film-originated 3232 pulldown material can be converted for display in accordance with a 50 Hz, rather than a 60 Hz, standard. In order to do this, it is necessary for the field sequence of the 60 Hz video to be determined. However, the 3232 field sequence may have been disrupted by editing as shown in FIG. 2 of the accompanying drawings. This figure illustrates how a video edit between a scene A and a scene B has disrupted the 3232 field sequence of the 60 Hz video, the video fields corresponding to the first, second, third etc film frames in each scene being labelled 1, 2, 3 etc in the figure. To allow for the presence of disruptions in the sequence due to editing, therefore, the field sequence must be monitored during processing of the 60 Hz video.

A system for converting 60 Hz 3232 pulldown format video for display at 50 Hz is described in international patent application number WO91/06182. According to this system, the repeated fields in the input 60 Hz signal are identified by calculating the difference between alternate fields in the input signal, ie successive fields of the same polarity. A repeated field is indicated by a zero difference. One field of each pair of repeated fields is eliminated, and the remaining fields are reordered as necessary to provide the required alternating field polarity. The output is a 48 Hz video signal, successive pairs of fields corresponding to respective frames of the original 24 Hz film. The 48 Hz signal can be recorded and replayed at 50 Hz, though there will of course be a 4% increase in the motion rate in the replayed image. More importantly, the output is frame-based since each odd/even field pair is derived from the same frame of film. The effect of this is to produce "film-like" motion portrayal in the resulting video image, and since interlaced fields derived from the same film frame are displayed one after the other, double imaging may be perceived when displayed.

Good motion portrayal in standards converted video signals can be achieved by a technique known as motion compensated temporal interpolation. This technique is described in detail in U.S. Pat. No. 5,005,077, issued Apr. 2, 1991, and corresponding to UK patent application number, and the disclosure in said U.S. Patent is incorporated herein by this reference for example. Briefly, however, the technique may involve: producing a series of progressive scan format frames from the fields of an input video signal, one progressive scan frame being produced for each input field; detecting motion in areas of the image between pairs of progressive scan frames by comparing blocks of pixels in each progressive scan frame with blocks of pixels in the following frame and deriving motion vectors representing the motion of the content of respective blocks between the two frames; and producing output fields/frames at the required temporal positions for the output standard, the pixels in each output frame being derived from pixels in a pair of the progressive scan frame as in dependence upon the motion vectors and the temporal offset between the output field/frame and the two progressive scan frames from which it is formed. In effect, interpolation is performed along the direction of movement of parts of the image between progressive scan frames to produce output fields/frames representing the image as if originally acquired at the output field/frame rate. This process provides high quality motion portrayal in the resulting video image.

SUMMARY OF THE INVENTION

According to the present invention there is provided a method of processing an input 60 field/s video signal generated by 3232 pulldown to produce an output video signal, the method comprising:

producing from the input signal a series of progressive scan format frames, each frame corresponding to a respective one of the input fields;

comparing blocks of pixels in each progressive scan frame with blocks of pixels in the following frame to derive motion vectors representing the motion of the content of respective blocks between frames;

utilising the motion vectors to monitor the field sequence of the input signal; and producing fields or frames of the output video signal using input fields or progressive scan frames selected in dependence upon the field sequence of the input signal, at least some of the output fields or frames being produced by motion compensated temporal interpolation utilising said motion vectors.

The invention therefore provides for conversion of 60 Hz 3232 pulldown material using motion compensated temporal interpolation for improved motion portrayal in the output signal, wherein the motion vectors required for the motion compensation process can also be used to monitor the field sequence of the input signal. An efficient system is therefore provided in which the advantages of motion compensated temporal interpolation are achieved with little additional processing being required to handle the 3232 pulldown material. The use of motion compensated temporal interpolation to produce the output signal also avoids the need for reordering input fields to give the correct field polarity sequence in a field format output signal as is required with the system of WO91/06182 referred to above.

Monitoring of the field sequence of the input signal enables those input fields or progressive scan frames which are required for use in the motion compensated interpolation process to be selected. For example, a pair of fields, one odd and one even, can be selected from each group of 3 and 2 in the input 3232 field sequence, the fields of each pair being composited to produce a progressive scan frame, and motion compensated temporal interpolation can be performed between pairs of the progressive scan frames so produced. In effect, this amounts to eliminating the repeat fields in the 3232 sequence and reconstructing the original 24 Hz frames from the remaining field pairs derived therefrom. However, since progressive scan frames, one for each input field, are generated for the purpose of deriving motion vectors, undue complexity is avoided by utilising the same progressive scan frames in the interpolation process. Thus, it is preferred that the output fields or frames are produced using selected progressive scan frames, the selected frames corresponding to one field in each group of 2 and 3 in the 3232 field sequence of the input signal. One progressive scan frame corresponding to each of the original 24 Hz film frames is therefore selected for use in the subsequent interpolation process. The selected progressive scan frames thus correspond to a series of 24 Hz frames.

The derived motion vectors can be used to produce output fields/frames corresponding to different field/frame rates simply by altering the interpolation ratios employed during the motion compensated interpolation process. When producing an output 2:1 interlace format signal for display at 50 Hz, output fields corresponding to 48 fields/s can be generated, although there will of course be a 4% speed increase in the image when displayed at 50 Hz. When producing 48 Hz output fields from the selected progressive scan frames (which are effectively 24 Hz frames as described above), alternate output fields can be interpolated between pairs of the progressive scan frames with an interpolation ratio of ½:½. Thus, alternate output fields are interpolated at temporal positions midway between a pair of progressive scan frames. The remaining output fields are temporally coincident with the 24 Hz progressive scan frames so that each of these fields can be derived directly from the corresponding progressive scan frame without interpolation. However, this may result in noticeable fluctuations in resolution between interpolated and non-interpolated fields in the output signal. Thus, when 48 Hz output fields are to be produced, it is preferred that alternate output fields are interpolated with an interpolation ratio of ¾:¼ and the remaining output fields are interpolated with an interpolation ratio of ¼:¾. Thus, the 48 Hz output field sequence is effectively temporally offset from the 24 Hz progressive scan frame sequence by one quarter of the progressive scan frame period, and output fields are interpolated alternately one quarter and three quarters of the way between successive progressive scan frames. The interpolation of all output fields in this way ensures consistent resolution when the output signal is displayed.

To avoid the 4% speed increase when displayed at 50 Hz, true 50 Hz output fields can be produced by motion compensated temporal interpolation between pairs of the selected progressive scan frames. The interpolation ratio for each output field is thus set in dependence upon the temporal offset of that output field relative to the pair of 24 Hz frames from which it is produced.

It will be appreciated that output fields or frames with a different line standard to the input signal can be produced. For example, 60 Hz video with a line standard of 525 lines/frame can be converted to 50 Hz video with a line standard of 625 lines/frame. Line standard conversion can be achieved using known interpolation techniques and could be performed after the output fields/frames have been produced by motion compensated temporal interpolation. Of course, however, the line conversion can be performed as part of the motion compensated temporal interpolation process, or, for example, as part of the process of producing progressive scan frames from the input fields.

It will also be appreciated that the invention provides apparatus arranged to perform a processing method as hereinbefore described. In general, where features have been described herein with reference to a method of the invention, corresponding features may be provided in accordance with an apparatus of the invention and vice versa.

BRIEF DESCRIPTION OF THE DRAWINGS

The above and other objects, features and advantages of the invention will be apparent from the following detailed description of illustrative embodiments which is to be read in conjunction with the accompanying drawings, in which:

FIG. 8b is a diagram used in explaining the operation of part of the control logic of FIG. 8a;

FIG. 9 is a timing diagram illustrating the operation of the control logic of FIG. 8a;

DESCRIPTION OF THE PREFERRED EMBODIMENTS

Figure 1:
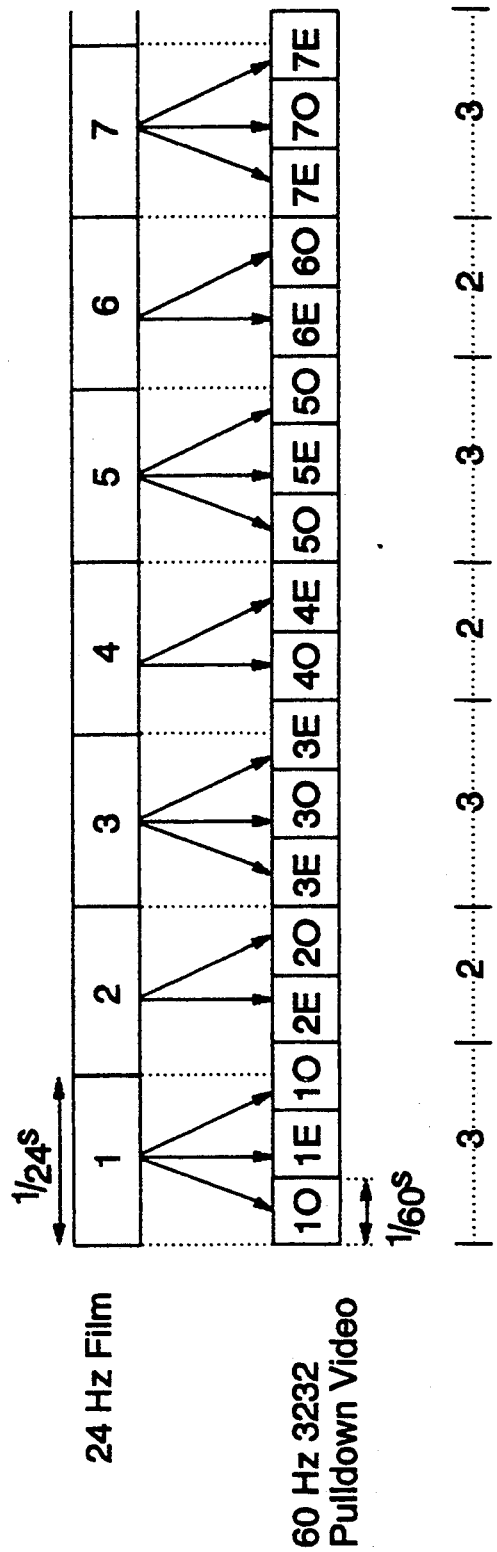
FIG. 1 illustrates the relationship between 24 Hz film and a 60 Hz 2:1 interlace format video signal derived from the film by 3232 pulldown.
Figure 2:
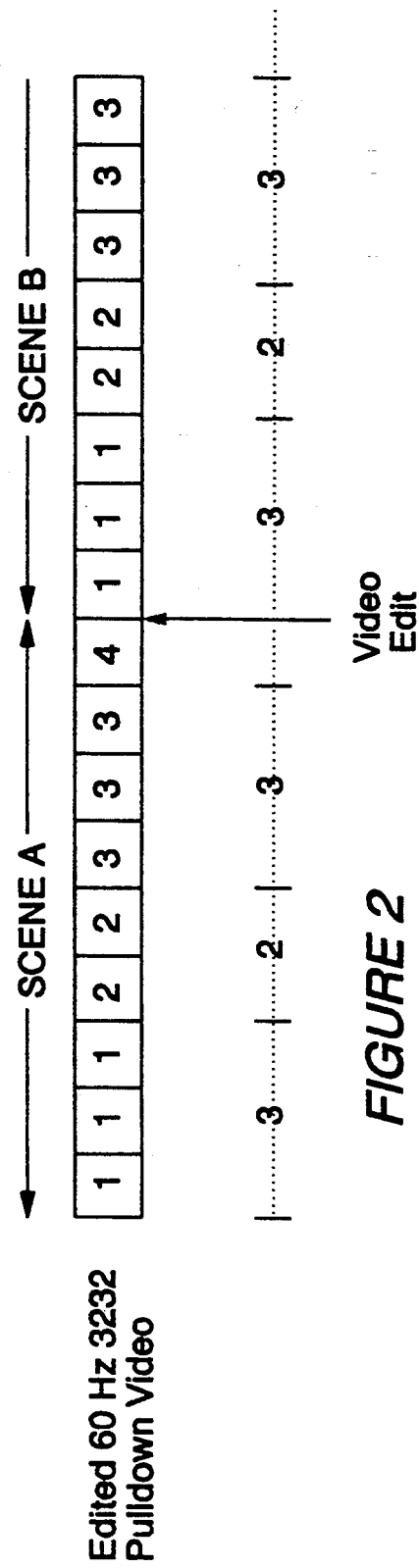
FIG. 2 illustrates disruption of the 3232 field sequence in the 60 Hz video signal by a video edit.
Figure 3:
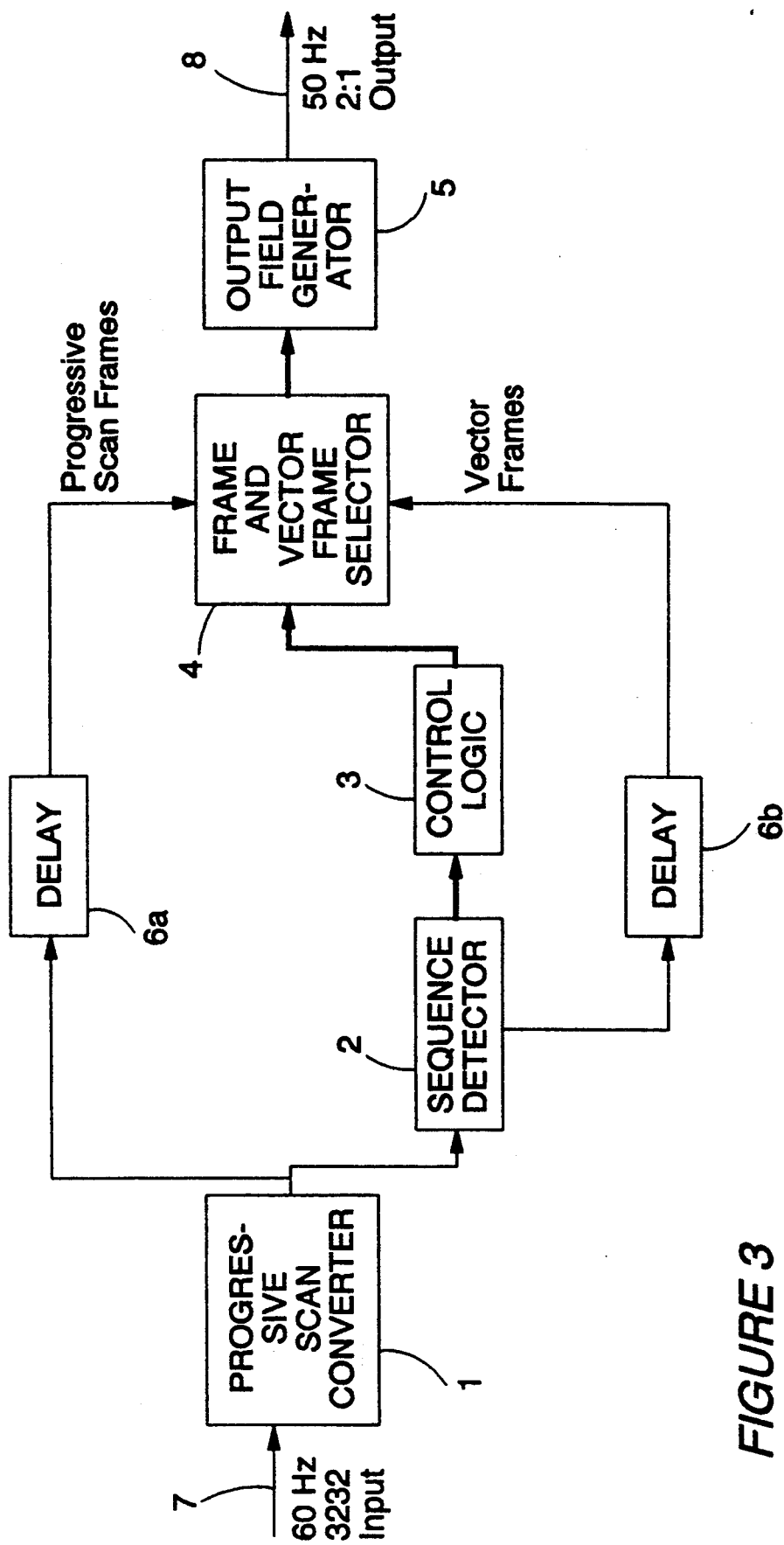
FIG. 3 is a schematic block diagram of apparatus embodying the invention for converting an input 60 Hz 3232 pulldown format video signal to an output 50 Hz 2:1 interlace format video signal.

The apparatus of FIG. 3 comprises a progressive scan converter 1, a sequence detector 2, control logic 3, a frame and vector frame selector 4, an output field generator 5, and two delays 6a and 6b, all connected as shown in the figure. The apparatus receives a 60 Hz, 525 lines/frame, 3232 pulldown format video signal on an input 7 of the apparatus and processes this input signal to generate a 50 Hz, 625 lines/frame, 2:1 interlace format output video signal which is supplied to an output 8 of the apparatus.

The progressive scan converter 1 converts the input fields supplied on the input 7 into progressive scan format frames at the same rate as the input fields. (For a detailed description of a process of progressive scan conversion reference is made to said U.S. Pat. No. 5,005,077 referred to above.) In the present embodiment, the progressive scan converter 1 incorporates a line standard converter (not shown) for converting the progressive scan frames produced with 525 lines/frame into corresponding progressive scan frames with 625 lines/frame by vertical interpolation in known manner. The output of the progressive scan converter 1 is a series of 625 lines/frame progressive scan format frames, each frame corresponding to a respective one of the input fields, which frames are supplied to the sequence detector 2 at the rate of 60 frames/s.

The sequence detector 2 operates to monitor the field sequence of the 60 Hz fields supplied to the input 7, and supplies to the control logic 3 an output indicative of the stage in the field sequence to which each successive input field corresponds. The operation of the sequence detector will be described in more detail with reference to FIG. 4. Briefly, however, the sequence detector compares blocks of pixels in each progressive scan frame supplied thereto with blocks of pixels in the following frame and, for each frame, derives a set of motion vectors representing the motion of the content of that frame between that frame and the following frame. The motion vectors are then processed in the sequence detector 2 to provide an output indicative of the stage in the input field sequence to which each progressive scan frame supplied to the sequence detector 2 (and hence each input field supplied to the apparatus) corresponds.

The output of the sequence detector 2 is used by the control logic 3 to control operation of the frame and vector frame selector 4. Under control of the control logic 3, certain progressive scan frames supplied by the progressive scan converter 1 via the delay 6a are selected for temporary storage in the selector 4 and for subsequent use by the output field generator 5 in generating the 50 Hz output fields. The selection of progressive scan frames depends upon the field sequence of the input signal in that only one progressive scan frame corresponding to each group of 3 and 2 in the input field sequence will be stored in the selector 4. The control logic 3 also controls storage in the selector 4 of frames of motion vectors supplied to the selector 4 from the sequence detector 2 via the delay 6b. Each time a frame is stored in the selector 4, the frame of motion vectors representing the motion between the frame preceding the stored frame and the stored frame is temporarily stored in the selector 4 for subsequent supply to the output field generator 5 for use in producing the 50 Hz output fields. The control logic 3 also generates an interpolation coefficient for each output field to be produced. This interpolation coefficient is supplied via the frame and vector frame selector 4 to the output field generator 5. The output field generator uses the progressive scan frames, motion vectors, and interpolation coefficients supplied thereto to generate the 50 Hz 2:1 interlace format output fields as will be described further below.

Figure 4:
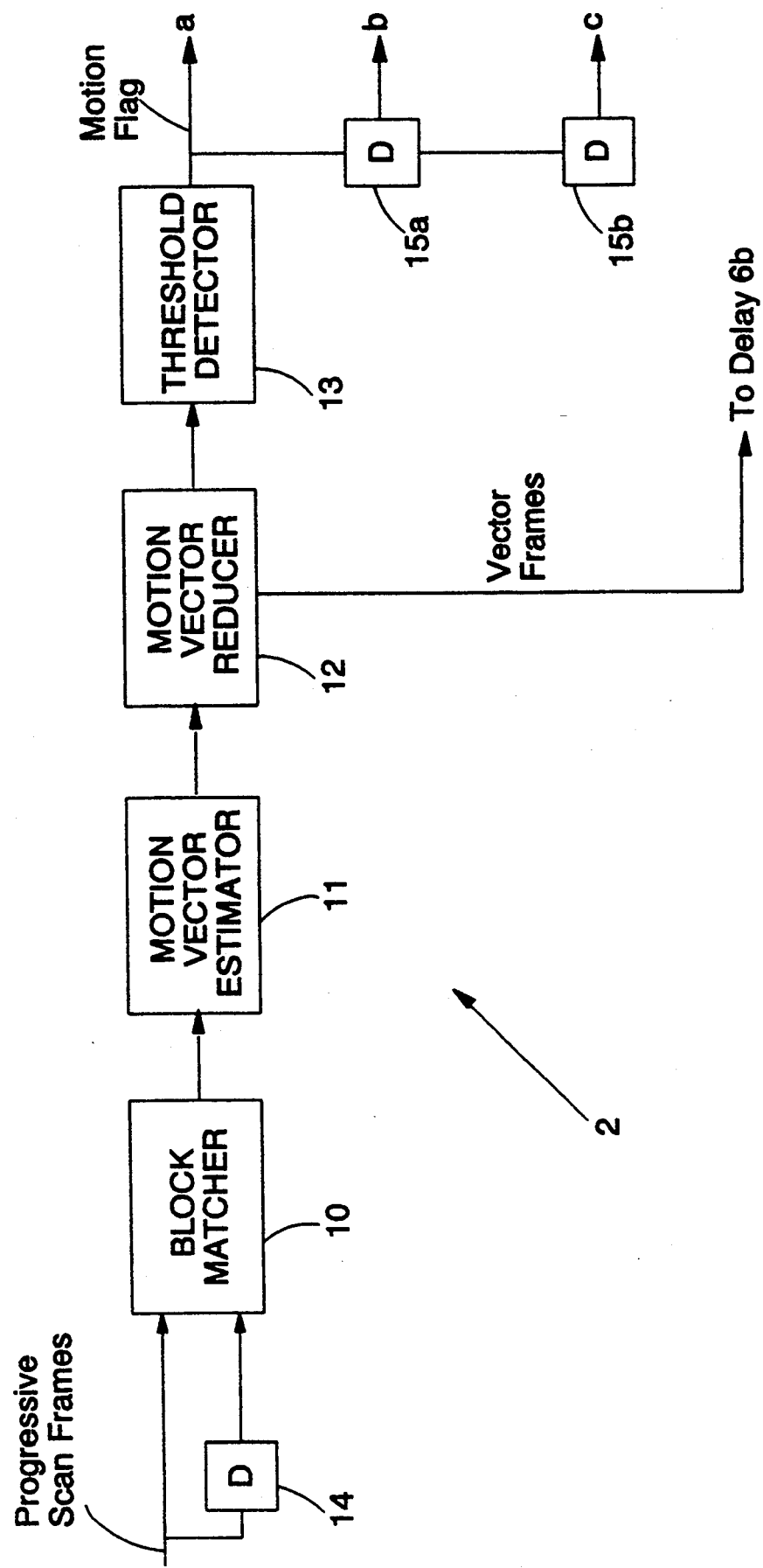
FIG. 4 is a schematic block diagram illustrating the sequence detector of FIG. 3 in more detail.

The operation of the sequence detector 2 will now be described in more detail with reference to FIG. 4. The sequence detector 2 comprises a block matcher 10, a motion vector estimator 11, a motion vector reducer 12, and a threshold detector 13, all connected as shown in the figure. The progressive scan frames output at 60 frames/s by the progressive scan converter 1 are supplied directly to one input of the block matcher 10. The input frames are also supplied via a 1/60s delay 14 to a second input of the block matcher 10. Thus, each progressive scan frame, and the immediately preceding progressive scan frame, is available to the block matcher 10 at the same time as successive frames are output by the progressive scan converter 1. The operations of the block marcher 10, motion vector estimator 11 and motion vector reducer 12 are described in detail in said U.S. Pat. No. 5,005,077 referred to above. Briefly, however, the operation of these components is as follows.

The block matcher 10 compares the content of blocks of pixels in a frame output by the delay 14 and the immediately following frame supplied directly to the block matcher 10 from the progressive scan converter 1. On the basis of this comparison, the block matcher 10 generates correlation surfaces representing the difference in the contents so compared in the two progressive scan frames. These correlation surfaces are then supplied to the motion vector estimator 11 which analyses the surfaces and derives motion vectors for the respective blocks representing the motion of the content of the blocks between the two frames. These motion vectors are then supplied to the motion vector reducer 12 in which additional motion vectors are assigned to each block. The additional motion vectors are selected from any unique motion vectors derived for the blocks surrounding the particular block under consideration and other vectors known as "global" motion vectors. These global motion vectors are determined in the vector reducer 12 by ranking motion vectors supplied by the motion vector estimator 11 for a given input frame in order of frequency of occurrence. The four most frequently occurring motion vectors which represent sufficiently different motion from one another are termed global motion vectors. The output of the motion vector reducer 12 to the delay 6b consists of a "frame" of motion vectors comprising the motion vectors associated with all the blocks in a frame supplied to the block matcher 10 by the delay 14.

At the same time as the vector frame is output by the motion vector reducer 12 to the delay 6b, the motion vector reducer provides an output to the threshold detector 13 indicating the total number of motion vectors which contributed to all the non-zero global motion vectors for that frame. The threshold detector then compares the number supplied by the motion vector reducer with a predetermined threshold number. The output of the threshold detector 13 constitutes a motion flag. The motion flag is set to logic 1 if the number supplied by the motion vector reducer 12 is greater than or equal to the predetermined threshold, and is set to logic 0 if the number supplied is less than the predetermined threshold.

The output of the threshold detector 13 forms one output, labelled as a in the figure, to the Sequence detector 2. The output a is connected via a 1/60s delay 15a to a second output b of the sequence detector, and via a further 1/60s delay 15b to a third output c of the sequence detector. Since progressive scan frames are supplied to the input of the sequence detector 2 at 60 frames/s, the effect of the three parallel outputs a, b and c of the sequence detector 2 is to supply to the control logic 4 the motion flag corresponding to each frame supplied at the input together with the motion flags for the two frames immediately preceding that frame. These three motion flags provide an indication of the stage in the original input field sequence to which the progressive scan frame whose motion flag is currently supplied on the output a corresponds. This will now be explained in more detail with reference to FIG. 5.

Figure 5:
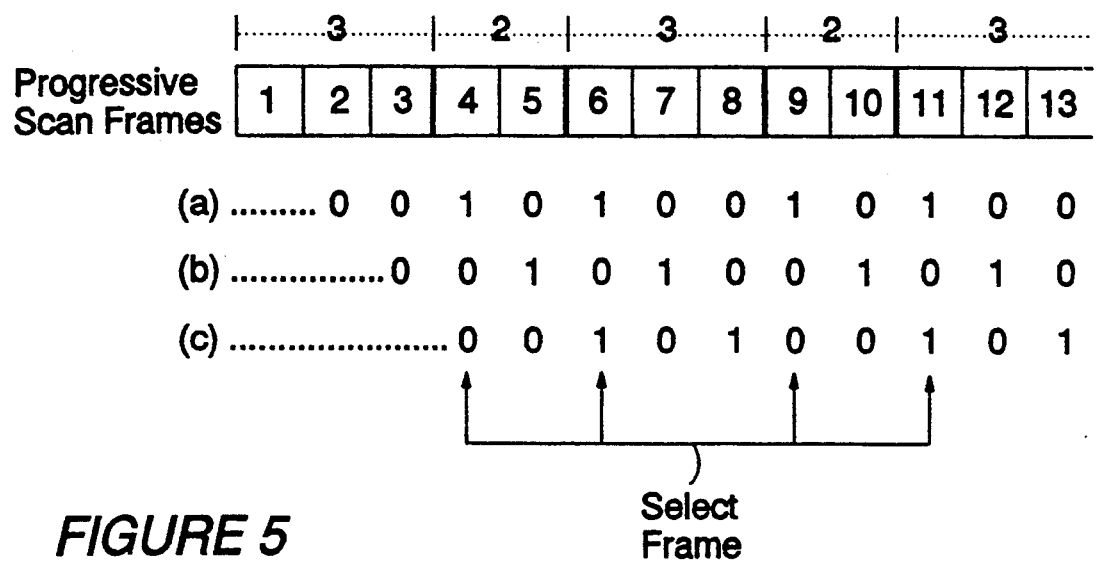
FIG. 5 is a diagram used in explaining the operation of the sequence detector of FIG. 4.

FIG. 5 shows a series of progressive scan frames, labelled 1, 2, 3 etc in the figure, which are supplied to the input of the sequence detector 2, starting with frame 1, at 60 frames/s. The 3232 sequence of the input fields to which the Series of progressive scan frames corresponds is also indicated, the boundaries between groups of 3 and 2 being marked by bold lines. (It is assumed here that there has been no disruption of the field sequence in this portion of the input signal due to editing.) Thus, the progressive scan frames in each group of 3 and 2 shown in the figure have been generated from input fields derived from the same 24 Hz film frame. In effect, therefore, each progressive scan frame is a reproduction of the original 24 Hz film frame to which the group of 3 or 2 corresponds, and the frames in each group should be substantially identical. As described with reference to FIG. 4, a progressive scan frame output by the delay 14 is supplied to the block matcher 10 together with the immediately following progressive scan frame supplied directly from the progressive scan converter 1. The sequence detector then compares the content of the two frames and generates motion vectors representative of the motion of the contents so compared between the two frames. Clearly, for pairs of frames within the same group of 3 or 2, there should be no movement in the image between the two frames, and so the motion vectors derived should, in theory, all be zero vectors. It follows that, for these pairs of frames, there should in theory be no non-zero global motion vectors derived in the motion vector reducer 12, and hence the number supplied to the threshold detector 13 should also be zero. In practice, however, some errors may be introduced by the processing operation and hence some non-zero global motion vectors may be identified. In this case, the number supplied to the threshold detector 13 (the number of motion vectors contributing to the non-zero global vectors) will be greater than zero. However, the predetermined threshold number set in the threshold detector 13 can be set to a level to allow for the effects of processing errors so that a motion flag of 0 is output whenever two frames from the same group of 3 or 2 are compared. An appropriate value for the predetermined threshold in the threshold detector 13, which may depend on the particular type of image material being processed, can be determined by experiment.

In contrast, two progressive scan frames which bridge the boundary between a group of 3 and a group of 2 in the figure are reproductions of different 24 Hz film frames and hence the content of such frames will be different (assuming there is indeed motion between these frames in the original film sequence as discussed further below). A significant proportion of non-zero motion vectors will be derived for such a frame pair, and a significant number of these vectors will contribute to the global vectors derived in the motion vector reducer 12. The number supplied by the motion vector reducer 12 to the threshold detector 13 in such cases will then exceed the predetermined threshold set in the detector 13, and hence a motion flag of 1 will be output by the threshold detector 13.

Line (a) of FIG. 5 indicates the sequence of motion flags appearing on output a of the sequence detector 2 as the series of progressive scan frames is input to the detector. Each motion flag is shown aligned with the input frame to which it corresponds. For example, the supply of frame 4 the sequence detector 2 by the progressive scan converter 1 will yield a motion flag of 1 since the immediately preceding frame, frame 3, will then be compared with frame 4, and frames 3 and 4 bridge a boundary in the 3232 sequence. Supply of progressive scan frame 5 to the sequence detector 2 will yield a motion flag of 0 since frames 4 and 5 correspond to the same group of 2 in the input sequence. Supply of frame 6 to the sequence detector will yield a motion flag of 1 since frames 5 and 6 again bridge a boundary between different groups in the 3232 sequence, and so on. Line (b) in FIG. 5 shows the sequence of motion flags appearing on output b of the sequence detector. This is simply the sequence on output a delayed by 1/60s, ie one input frame period. Similarly, line (c) in FIG. 5 shows the sequence of motion flags appearing on output c of the sequence detector which is simply the sequence on output a delayed by 2/60s, ie two input frame periods.

From FIG. 5 it will be seen that the parallel output (a, b, c) of the sequence detector 2 provides an indication of the stage in the input 3232 field sequence to which each frame in the series of progressive scan frames corresponds. For example, an output of (1, 0, 0) indicates the first frame in a group of 2. An output of (0, 1, 0) indicates the second frame in a group of 2, and an output of (1, 0, 1) indicates the first frame in a group of 3. The output of the sequence detector 2 can thus be used by the control logic 3 (FIG. 3) to determine which progressive scan frames should be selected from the complete input frame sequence for use in the subsequent generation of output fields by motion compensated temporal interpolation. Only one progressive scan frame from each group of 3 or 2 is required for this process. In this present embodiment, the first frame in each group of 3 and 2 is selected as indicated by the arrows in FIG. 5. Thus, for example, an output to the sequence detector 2 of (1, 0, 1) indicates to the control logic that an input frame should be selected. The control logic 3 utilises this input to generate write enable signals to control writing of the selected frames, and the frames of motion vectors corresponding thereto, into respective stores in the frame and vector frame selector 4 the structure and operation of which will now be described with reference to FIG. 6.

Figure 6:
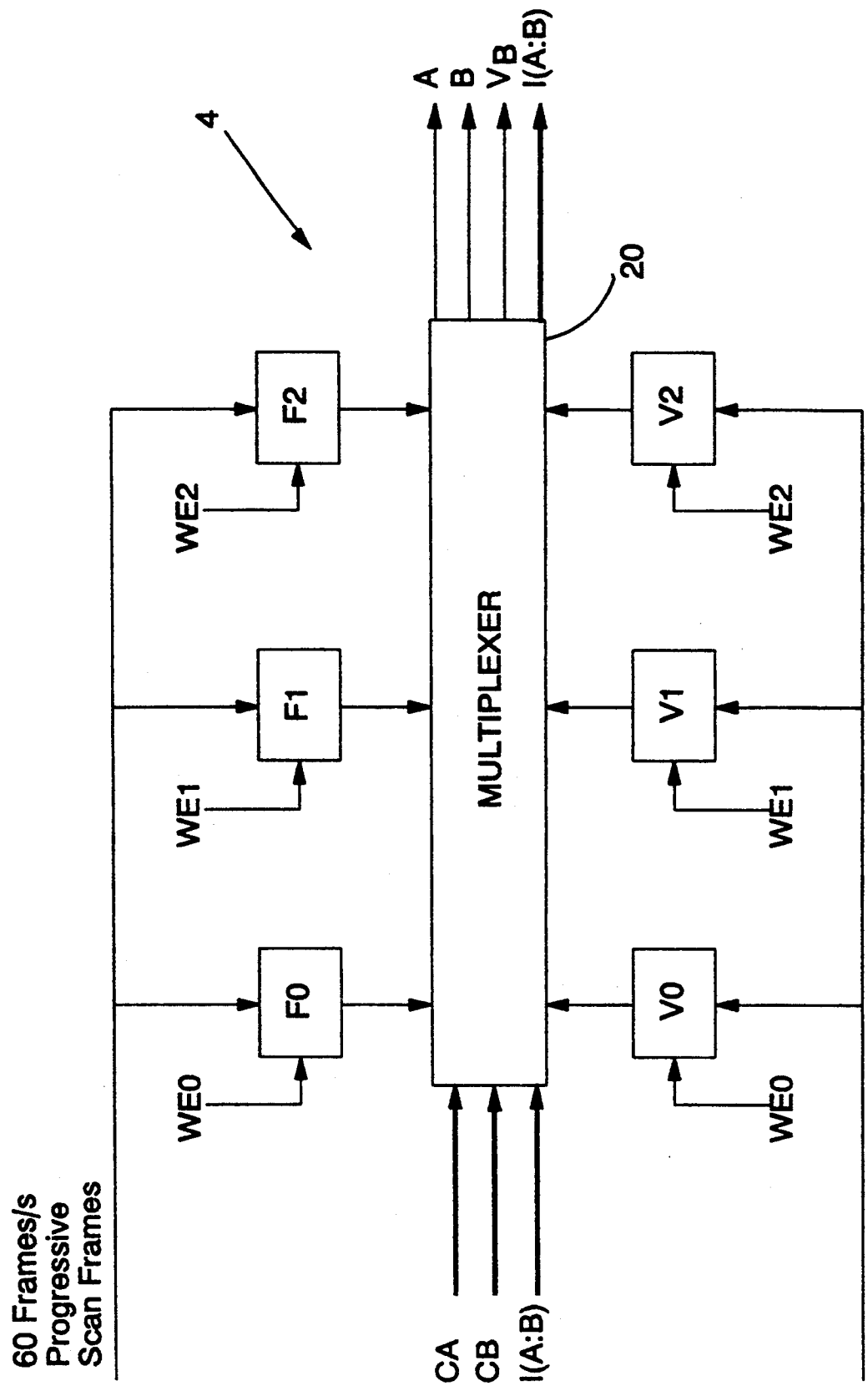
FIG. 6 is a schematic block diagram illustrating the frame and vector frame selector of FIG. 3 in more detail.

The selector 4 shown in FIG. 6 comprises three frame stores F0, F1 and F2 which receive the delayed progressive scan frames, at 60 frames/s, from the delay 6a in FIG. 3. The selector 4 also comprises three vector stores V0, V1 and V2 which receive the delayed vector frames from the delay 6b in FIG. 3 in synchronism with the corresponding progressive scan frames supplied to the frame stores F0 to F2. Each of the frame and vector stores has an output connected to a multiplexer 20. Write enable signals WE0, WE1 and WE2 are supplied by the control logic 3 to the frame stores F0 to F2 and vector stores V0 to V2 as shown in the figure. The write enable signals WE0 to WE2 are generated sequentially and a cyclical manner by the control logic 3 each time the output of the sequence detector 2 indicates to the control logic 3 that a particular progressive scan frame in the input sequence should be selected as previously described. The purpose of the delays 6a and 6b in FIG. 3 is therefore to compensate for processing times in the sequence detector 2 so that the output of the sequence detector 2 at any time corresponds to the progressive scan frame, and the corresponding vector frame, being supplied at that time to the selector 4. As successive input frames are selected, these are stored in successive frame stores F0 to F2 in a cyclical manner. Since the write enable signals WE0 to WE2 are also supplied to the vector stores V0 to V2, the frame of motion vectors corresponding to each selected progressive scan frame (ie the frame of vectors representing the motion between the immediately preceding progressive scan frame and the selected progressive scan frame) is stored in the corresponding vector store V0 to V2. Since one progressive scan frame is selected for each group of 3 and 2 in the input field sequence, and hence for each of the original 24 Hz film frames, the frames sequentially stored in the frame stores F0 to F2 represent a series of 24 Hz frames corresponding to the original film sequence. The frames of vectors stored sequentially in the vector stores V0 to V2 are thus the motion vectors describing the motion in the image between successive ones of the stored 24 Hz frames.

Figure 7:
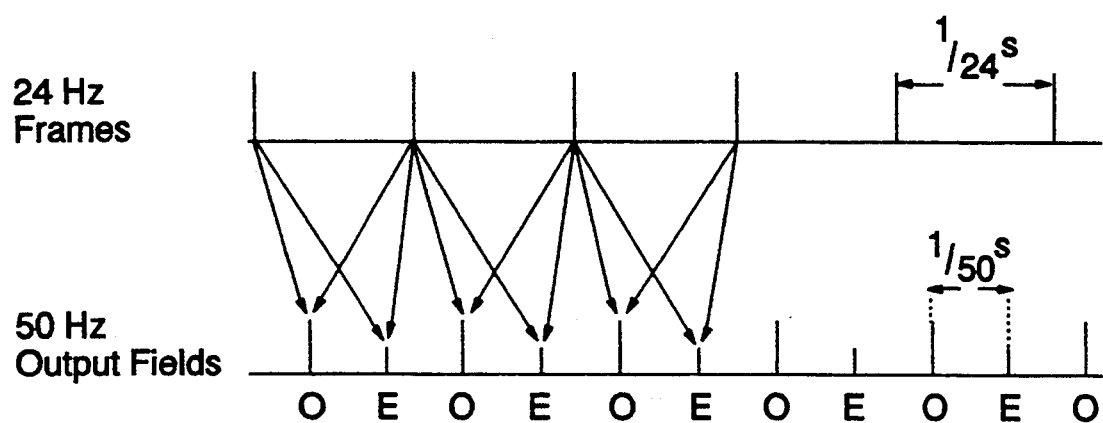
FIG. 7 is a diagram illustrating the relationship between a series of 50 Hz output fields and the 24 Hz frames from which the output fields are produced.

The progressive scan frames and frames of motion vectors stored in the frame stores F0 to F2 and the vector stores V0 to V2 are to be used by the output field generators 5 to generate 50 Hz 2:1 interlace format video fields by motion compensated temporal interpolation. FIG. 7 shows the temporal relationship between the sequence of 24 Hz progressive scan frames stored cyclically in the frame stores F0 to F2 and the 50 Hz video fields, alternately odd "O" and even "E", to be derived therefrom. Each output field can be generated from pixels in a pair of the progressive scan frames as indicated by the arrows in the figure. Which pixels in the pair of progressive scan frames are to be used to produce a pixel in an output field is determined from the motion vectors as discussed further below. The proportions of pixels in each of the progressive scan frames combined to produce the output pixel depends upon the temporal offset between the output field and the progressive scan frames from which it is produced. For example, if an output field is temporally 8/10 of the way between two progressive scan frames, then pixels in the first and second progressive scan frames will be combined in the ratio 2/10:8/10 to produce pixels in the output field. The contribution to output pixels is therefore greater for the progressive scan frame which is temporally closer to the output field position. Thus, for each output field to be produced by the output field generator 5, the selector 4 must supply a pair of progressive scan frames, a frame of motion vectors, and an indication of the temporal offset of the output field to be produced from the pair of progressive scan frames.

Referring again to FIG. 6 the multiplexer has two frame outputs, A and B, each of which can be selectively connected to the output of one of the frame stores F0 to F2. At any one time, a frame stored in one of the frame stores F0 to F2 is read out and supplied to the output A of the multiplexer, and a frame stored in another of the frame stores F0 to F2 is read out and supplied to the output B of the multiplexer. The multiplexer 20 receives from the control logic 3 two read control counts CA and CB. The control count CA determines which of the frame stores F0 to F2 should be connected at any one time to the output A of the multiplexer. The control count CB determines which of the frame stores F0 to F2 should be connected at any one time to the output B of the multiplexer. The multiplexer 20 also has an output $V_B$ which can be selectively connected to the output of one of the vector stores V0 to V2. The control count CB controls which of the vector stores V0 to V2 is connected at any one time to the output $V_B$. Thus, the frame of motion vectors corresponding to the progressive scan frame being supplied to the output B of the multiplexer at any time is supplied on the output $V_B$ of the multiplexer. The multiplexer 20 also receives from the control logic 3 an interpolation coefficient I(A:B) which indicates the temporal offset of the 50 Hz output field to be produced from the pair of frames to be supplied to the outputs A and B of the multiplexer as determined by the read control counts CA and CB. This interpolation coefficient I(A:B) is supplied to a further output of the multiplexer as the corresponding pair of frames is supplied to the outputs A and B.

The control logic 3 will now be described in more detail with reference to FIG. 8a. The control logic 3 comprises a modulo-5 counter and decoder 25 which receives as its input the parallel output (a, b, c) of the sequence detector 2 described with reference to FIG. 4. The modulo-5 counter and decoder 25 also receives a 60 Hz clock signal synchronised with the progressive scan frames output at 60 frames/s by the delay 6a in FIG. 3 and supplied to the frame and vector frame selector 4. The 60 Hz clock signal causes the modulo-5 counter to cycle through the count 0, 1, 2, 3, 4, 0, 1 etc, with the count changing once as each successive frame is supplied to the selector 4. The decoder causes the count of the modulo-5 counter to be reset to 0 each time the input (a, b, c) indicates the first frame in a group of 3 in the 3232 sequence, ie when the input is (1, 0, 1) as explained with reference to FIG. 5. Each time the modulo-5 counter is reset to 0, the decoder generates a reset pulse (R) on an output 26 thereof. The decoder also generates increment pulses (INC) on an output 27 thereof which is connected to a modulo-3 counter 28. The increment pulses are generated each time the modulo-5 counter indicates a count of zero or three. Since a count of zero on the modulo-5 counter corresponds to a sequence detector output of (1, 0, 1) which indicates the first frame in a group of 3 in the 3232 sequence, a count of three on the modulo-5 counter indicates the third frame after this first frame, ie the first frame in a group of 2 in the 3232 sequence (see FIG. 5). Thus, an increment pulse is supplied to the modulo-3 counter 28 each time the first frame in a group of 3 or 2 in the input frame sequence is supplied to the frame and vector frame selector 4 in FIG. 3. The increment pulses therefore indicate that the frame currently being supplied to the selector 4 is to be written to one of the frame stores F0 to F2.

The modulo-3 counter 28 cycles through the count 0, 1, 2, 0, 1 etc, the count being incremented once with each increment pulse received from the output 27 of the modulo-5 counter and decoder 25. The current count of the modulo-3 counter 28 is supplied to a decoder 29 which converts the count into a write enable signal WE0, WE1 or WE2, for supply to the corresponding frame and vector stores in FIG. 6. The write enable signals WE0 to WE2 are thus generated cyclically as the modulo-3 counter cycles through its count of 0, 1, 2 etc. The modulo-3 counter 28 is, however, incremented irregularly in view of the 3232 frame sequence. Each write enable signal WE0 to WE2 must be generated for the period of one progressive scan frame only and not for the duration of the corresponding ount on the modulo-3 counter 28. Thus, the increment signal on the output 27 of the modulo-5 counter and decoder 25 is supplied to a "write valid" input (WV) of the decoder 29. Each time the modulo-3 counter 28 is incremented by an increment pulse supplied thereto, the appropriate write enable signal WE0 to WE2 is generated by the decoder 29 only for the duration of the increment pulse supplied to the WV input of the decoder. Thus, each write enable signal is generated for a period 1/60s, so that the required progressive scan frames are written cyclically (although irregularly) into the frame stores F0 to F2 in FIG. 6.

It will be appreciated that, since the increment pulses on the output 27 of the modulo-5 counter and decoder 25 are generated in dependence upon the state of the modulo-5 counter which is clocked at 60 Hz, these pulses will continue to be generated even when there is in fact no motion in the input frame sequence. In the absence of motion, the output (a, b, c) of the sequence detector 2 would continually be (0, 0, 0). The modulo-5 counter continues to be incremented by the 60 Hz clock so that, when there is no motion in the input sequence, progressive scan frames continue to be stored in the frame and vector frame selector 4 as though the 3232 Sequence had been maintained. When motion is reintroduced in the input frame sequence following a period of no motion, the state of the modulo-5 counter should still be correct in relation to the 3232 sequence unless there has been an edit in the original input field sequence. Wherever an edit appears in the input sequence, whether or not during a sequence in which there is motion, the modulo-5 counter will be reset to count 0 with the next input of (1, 0, 1) from the sequence detector 2 indicating that the 3232 sequence has been reestablished. Thus, the state of the modulo-5 counter is corrected after an edit, and selection of progressive scan frames then continues as before.

It is desirable for the pairs of frames to be used to form the output fields to be read out of the frame stores F0 to F2 in FIG. 6 at the same rate as the output fields to be produced, ie 50 Hz. Thus, the read control counts CA and CB produced by the control logic 3 must be generated at 50 Hz in timed relation to the 24 frames/s frames stored in the frame stores F0 to F2 from which the output fields are to be produced. Since the modulo-3 counter 28 is incremented irregularly, rather than at 24 Hz, in view of the 3232 frame sequence, it is necessary to derive a 24 Hz reference signal which can then be sampled at 50 Hz to give the required timing relationship. It is for this reason that a reset pulse R is supplied on the output 26 of the modulo-5 counter and decoder 25 each time the modulo-5 counter is reset to a count of zero. As previously described, a count of zero on the modulo-5 counter indicates the first frame in a group of 3 in the 3232 frame sequence. The reset pulses R will therefore be generated once every five frames in the input progressive scan frame sequence, ie every 5/60s. These reset pulses are supplied to a modulo-3125 counter 30 which is clocked by a 75 KHz clock signal. The modulo-3125 counter 30 cycles through a count of 0, 1, 2 . . . 3124, 0, 1 etc with the count being incremented by the 75 KHz clock signal. The reset pulses R supplied by the modulo-5 counter and decoder 25 reset the modulo-3125 counter 30 to zero, so that after the first reset pulse R the counter 30 is synchronised with the input progressive scan frame sequence. Again, if an edit in the input signal results in disruption of the 3232 sequence, a new reset pulse R will be generated when the sequence is reestablished and the counter 30 will be resynchronised. The modulo-3125 counter 30 itself generates a pulse (r) on a reset output 39 thereof each time the count returns to zero. The effect of this is to generate a series of 24 Hz pulses on the reset output 39 as will now be explained with reference to FIG. 8b.

Figure 8A:
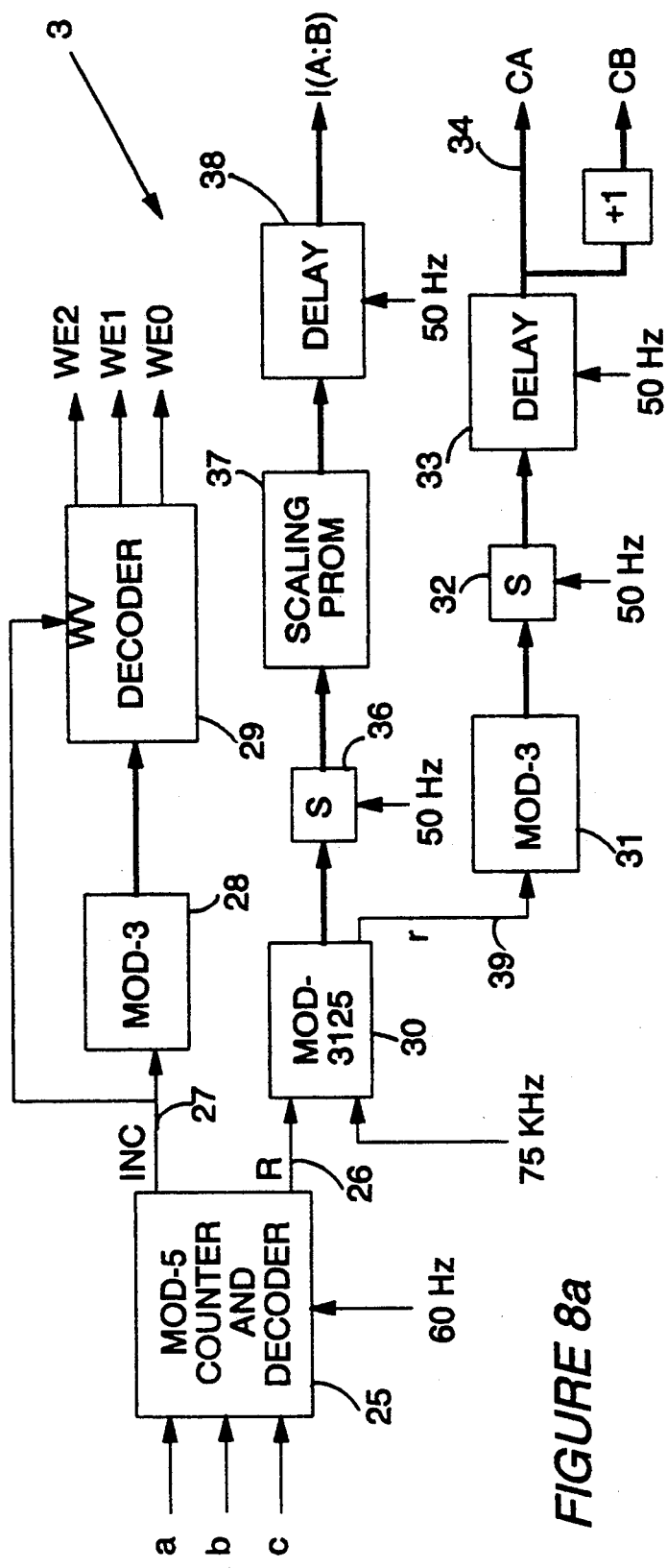
FIG. 8a is a schematic block diagram illustrating the control logic of FIG. 3 in more detail.
Figure 8B:
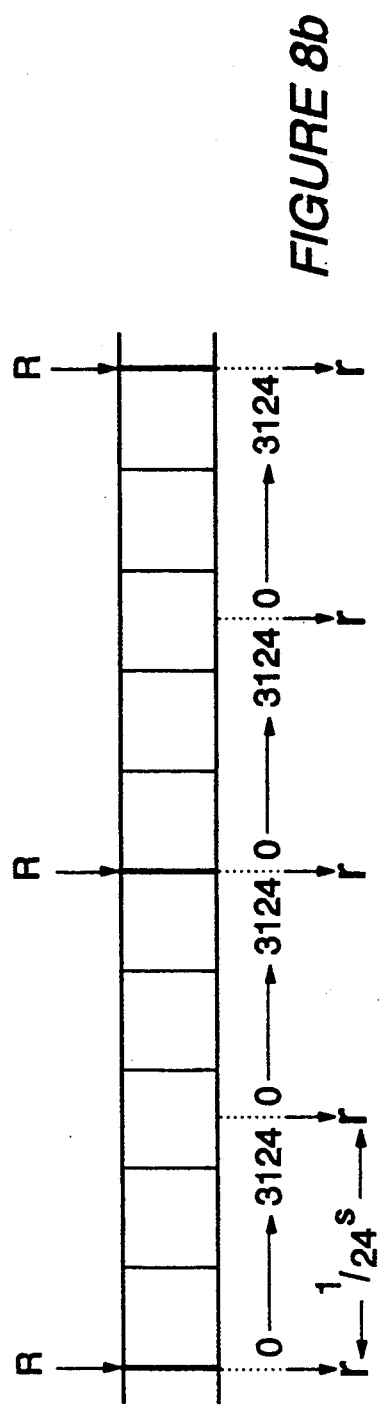

FIG. 8b shows a series of the progressive scan frames supplied to the frame and vector frame selector 4 indicating the 3232 sequence with the five-frame boundaries indicated by bold lines. As previously explained, the count of the modulo-3125 counter 30 is set to zero by a reset pulse R from the modulo-5 counter and decoder which indicates the first frame in a group of 3. Thus, the first output pulse r generated by the modulo-3125 counter is synchronised with the start of a group of five frames as shown in the figure. The counter 30 is chosen to be a modulo-3125 counter since 3125 is the number of lines of pixels in five of the progressive scan frames, each of which contains 625 lines in this example. Thus, with the counter incremented at 75 KHz (which equals twice the line rate in the input 60 frames/s frames) the counter 30 will complete a full count cycle twice for every five frames supplied to the selector 4. Thus, the counter 30 generates an output pulse r once every $2\frac{1}{2}$ frame periods, ie at 24 Hz as shown in FIG. 8b. This 24 Hz signal thus marks the timings of the 24 Hz frames stored in the frame stores F0 to F2 in FIG. 6 from which the 50 Hz output fields are to be derived.

Referring back to FIG. 8a, the 24 Hz output pulses r of the modulo-3125 counter 30 are used to increment the modulo-3 counter 31 which thus cycles through the count 0, 1, 2, 0, 1 etc, the count being incremented once every 1/24s. The modulo-3 counter 31 is connected to a sampler (S) 32 which is clocked at 50 Hz. The current count of the modulo-3 counter 31 is thus sampled once every 1/50s and the sampled count is supplied to a delay 33 clocked by the same 50 Hz signal as the sampler 32. The delay 33 serves to delay the sampled count by three periods of the 50 Hz clock signal before the sampled count is passed to an output 34 of the delay as the first read control count CA. (The purpose of the delay 33 is to ensure that read control counts are not generated before the relevant progressive scan frames have actually been written to the frame stores F0 to F2.) The read control count CA can thus take the value 0, 1 or 2 to indicate to the multiplexer 20 in FIG. 6 that the frame currently stored in frame store F0, F1 or F2 respectively should be supplied to the output A of the multiplexer. The second multiplexer control count CB is generated by incrementing, modulo-3, the value of the control count CA by one count. Again a value of 0, 1 or 2 for the control count CB indicates to the multiplexer 20 that the frame currently stored in the frame store F0, F1 or F2 respectively should be supplied to the output B of the multiplexer. The signal CB also triggers the supply of the motion vectors currently stored in the corresponding vector store V0, V1 or V2 to the output $V_B$ of the multiplexer 20. The control counts CA and CB are thus generated 50 times per second and a pair of frames stored in the frame stores F0 to F2 are supplied on the outputs of the multiplexer along with the motion vectors corresponding to the frame currently supplied to the output B of the multiplexer.

The count of the modulo-3125 counter 30 in FIG. 8a is also used to generate interpolation coefficients I(A:B) for the 50 Hz fields to be generated from the pairs of 24 Hz frames supplied on the outputs A and B of the multiplexer 20 in FIG. 6. These coefficients indicate the temporal offset of each output field to be produced from the pair of frames from which it is to be formed. For example, if an output field is to be produced at a temporal position 8/10 of the way between two 24 Hz frames supplied on the outputs A and B, the interpolation coefficient I(A:B) will be 0.8.

To generate the interpolation coefficients I(A:B), the current count of the modulo-3125 counter 30 is supplied to a sampler (S) 36 clocked by the same 50 Hz signal as supplied to the sampler 32. The count of the modulo-3125 counter 30 is thus sampled at the output field rate, and the value of the count sampled by the sampler 36 gives an indication of the temporal position of the output field relative to the 24 Hz frames. The sampled count is supplied to a scaling PROM 37 which converts the sampled count into an interpolation coefficient I(A:B). The interpolation coefficient I(A:B) is supplied via a delay 38 to the multiplexer 20 in FIG. 6 in synchronism with the corresponding control counts CA and CB. The multiplexer 20 then supplies the interpolation coefficient I(A:B) to its output along with the corresponding pair of frames on its outputs A and B and the motion vectors on its output $V_B$.

FIG. 9 is a timing diagram which illustrates the operation of the control logic 3 described above. The horizontal axis in FIG. 9 represents a time axis. The first line in FIG. 9 indicates the count of the modulo-3 counter 28 in FIG. 8a, where the width of each box represents 1/60s synchronised with the progressive scan frames supplied at 60 frames/s to the frame and vector frame selector 4 in FIG. 3. As shown, the count of the modulo-3 counter 28 is incremented cyclically through the counts 0, 1, 2, 0 etc with the duration of each count depending on the 3232 sequence of the progressive scan frames. The second line in FIG. 9 illustrates the writing of progressive scan frames and vector frames into the frame and vector stores F0 to F2 and V0 to V2 in FIG. 6. Where there is a number in the boxes in this line, this indicates that the progressive scan frame supplied to the selector 4 during that 1/60s period is written to the frame store corresponding to the number in that box (the numerals 0, 1 and 2 corresponding to the frame stores F0, F1 and F2 respectively). At the same time, the frame of motion vectors corresponding to the frame written into a frame store is written into the vector store V0, V1 or V2 corresponding to the number in the box. It will be seen, therefore, that selected frames (and the corresponding frames of motion vectors) are written cyclically into the frame stores F0 to F2 (and the vector stores V0 to V2) at an irregular rate due to the 3232 sequence.

The third line in FIG. 9 indicates the count of the modulo-3 counter 31 which cycles through the counts 0, 1, 2, 0 etc at a rate of 24 Hz synchronised with the 60 frames/s frames. It will be seen that the count of this counter 31 corresponds to the count of the modulo-3 counter 28 but incremented at a regular rate of 24 Hz.

The fourth line in FIG. 9 indicates the count of the modulo-3 counter 31 as sampled at 50 Hz by the sampler 32. The width of each box in this line thus represents 1/50s. The timing of the boxes in this line relative to the boxes in the third line indicates the relative timing of the output fields and the 24 Hz frames from which they are to be produced.

The fifth line in FIG. 9 indicates the count sampled by the sampler 32 after the delay of 3/50s introduced by the delay 33. Thus, this line indicates the value of the read control count CA on the output 34 of the delay 33. The sixth line in FIG. 9 gives the values of the control counts CA, CB for each 1/50s period. As previously described, these counts indicate which two frame stores F0 to F2 are to be connected to the outputs A and B of the multiplexer 20 at any time. Thus, values for CA, CB of 2, 0 indicate that frame store F2 should be connected to output A of the multiplexer 20 and frame store F0 should be connected to output B of the multiplexer 20. As previously described, the control count CB is also used to indicate which of the vector stores V0 to V2 is to be connected to the output $V_B$ of the multiplexer 20 so that the frame of motion vectors corresponding to the frame currently supplied to the output B of the multiplexer is supplied on the output $V_B$. The bottom line in FIG. 9 indicates the sequence of interpolation coefficients for the 50 Hz output fields to be produced. Each interpolation coefficient indicates the proportion of the way between a pair of 24 Hz frames that the output field to be produced is located. As previously described, the locations of the boxes in the fourth line of FIG. 9 indicate the timings of the 50 Hz output fields to be produced relative to the timings of the 24 Hz progressive scan frames as represented by the locations of the boxes in line 3 of FIG. 9. Thus, considering the first box in line 4 of the figure, this box is located 0.36 of the way between two 24 Hz frames giving an interpolation coefficient of 0.36. The second box in line 4 is located 0.84 of the way between the same two 24 progressive scan frames giving an interpolation coefficient of 0.84. The third box in line 4 is located 0.32 of the way between the next pair of 24 Hz frames giving an interpolation coefficient of 0.32 and so on.

Figure 10:
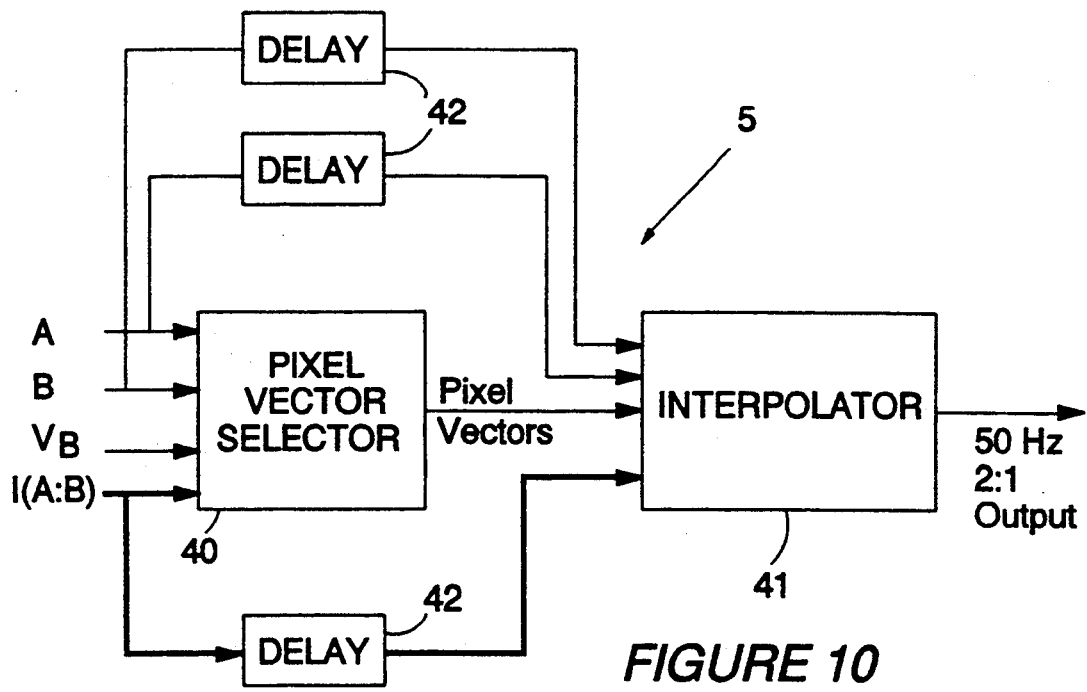
FIG. 10 is a schematic block diagram illustrating the output field generator of FIG. 3 in more detail.

Under control of the control logic 3, therefore, pairs of progressive scan frames, together with a frame of motion vectors and an interpolation coefficient, are supplied by the selector 4 to the output field generator 5 fifty times per second. The output field generator 5 is shown in more detail in FIG. 10. As shown in this figure, the outputs of the multiplexer 20 are supplied to a pixel vector selector 40 the output of which is connected to an interpolator 41. The progressive scan frames on the outputs A and B of the multiplexer 20 are also supplied to the interpolator 41 via delays 42 which compensate for the processing time of the pixel vector selector 40 before its output is supplied to the interpolator 41. The interpolation coefficient I(A:B) output by the multiplexer 20 is also supplied to the interpolator 41 via a similar compensating delay 42.

Figure 11:
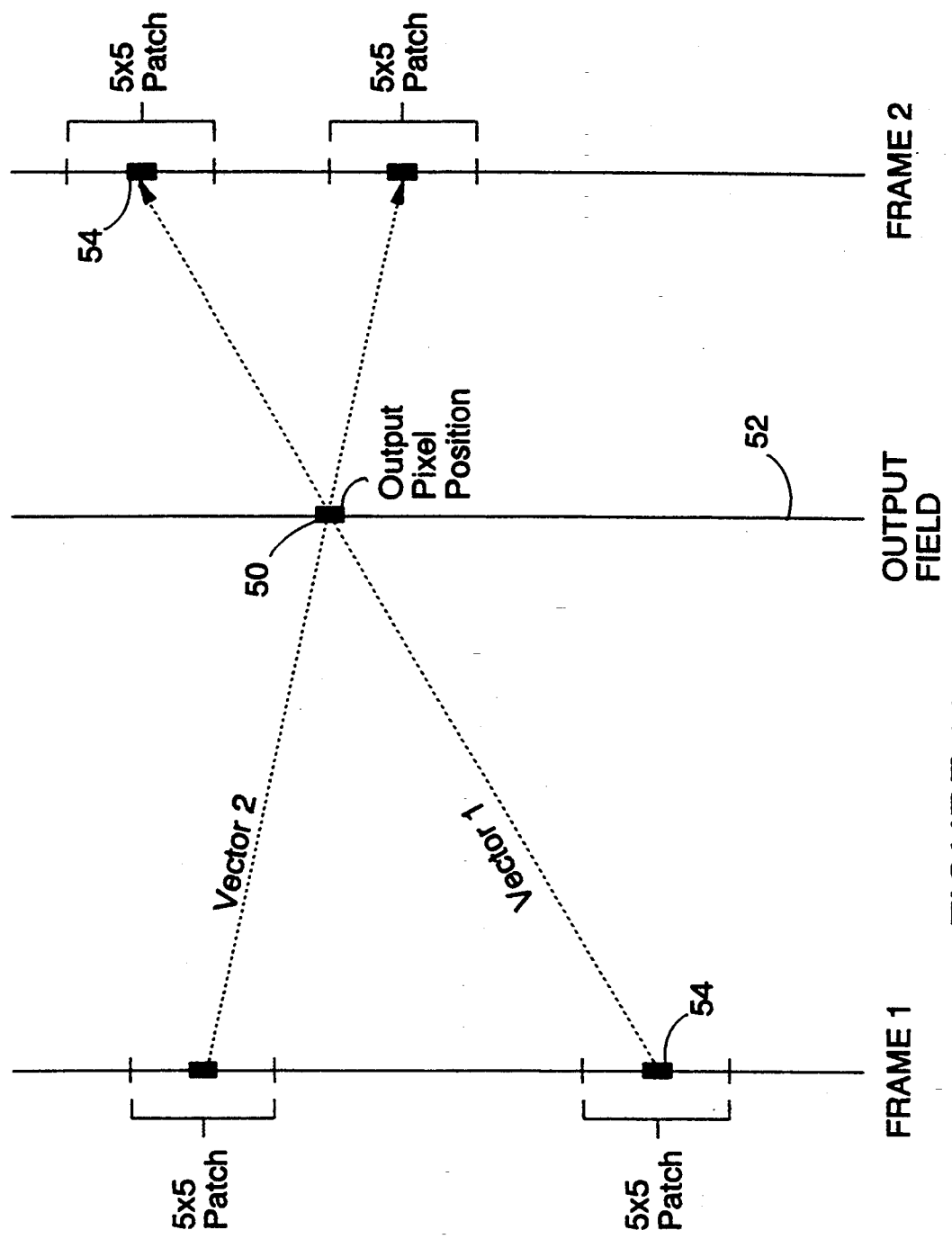
FIG. 11 is a diagram used in explaining the operation of part of the output field generator of FIG. 10.

The purpose of the pixel vector selector 40 is to select from the input frame of motion vectors a motion vector for each pixel of the output field to be produced. A pixel vector selection process is described in detail in said U.S. Pat. No. 5,005,077 referred to above. The present embodiment utilises a simplified version of the process described in U.S. Pat. No. 5,005,077 as follows. For each output pixel, the motion vectors, supplied on the output $V_B$ of the multiplexer 20, which correspond to a block of pixels surrounding the output pixel position are tested. The test involves considering the output pixel position to be located the correct proportion of the way along the motion vector as determined by the temporal offset of the output field to be produced from the pair of frames from which the output field is to be formed. This is given by the interpolation coefficient I(A:B) as discussed earlier. FIG. 11 illustrates schematically two motion vectors (vector 1 and vector 2) to be tested for an output pixel 50 of an output field 52 to be generated from two 24 Hz frames, frame 1 and frame 2. When viewed in this way, it can be seen that the ends of each motion vector "point" to pixels in each of the progressive scan frames. For example, vector 1 points to respective pixels 54 in frame 1 and frame 2. The degree of correlation between the 5×5 patches of pixels surrounding the pixels 54 in the input frames is then calculated. The degree of correlation between the pixel patches is determined by calculating the absolute luminance difference between pairs of pixels at corresponding positions in the two 5×5 patches. These absolute luminance difference values are then added to produce a sum of absolute luminance differences (SAD) associated with the motion vector under test. A high SAD value indicates a low degree of correlation between the patches compared, and a low SAD value indicates a high degree of correlation between the patches. The SAD value is calculated for each of the motion vectors to be tested for each output pixel, and the motion vector having the lowest SAD value is selected as the motion vector for that output pixel. The output pixel vectors are then supplied by the pixel vector selector 40 to the interpolator 41.

The interpolator 41 generates the pixels of each output field by interpolation between the two progressive scan frames supplied thereto for that output field, each output field consisting of alternate lines of pixels in dependence upon whether the field is an odd field or an even field to provide the required 2:1 interlace in the output signal. For each output pixel, the interpolator 41 uses the motion vector supplied for that output pixel, and the correct temporal position along the motion vector for output pixels in that field, as indicated by the interpolation coefficient I(A:B) supplied thereto, to locate the appropriate pixels in the pair of progressive scan frames which are to be combined to produce the output pixel. The value of each output pixel is obtained by combining the values of the pixels located in the progressive scan frames with appropriate weighting in dependence upon the interpolation coefficient as described earlier. For example, an interpolation coefficient of 0.8 indicates that the values of the pixels located in the two progressive scan frames should be combined in the ratio 2/10:8/10, so that the frame which is temporally nearer to the output field contributes more to the output pixels than the frame which is temporally further from the output field. Similarly, for example, an interpolation coefficient of 0.2 indicates that the pixels of an output field should be produced by combining the pixels in the two progressive scan frames in the ratio (the "interpolation ratio") 8/10:2/10. The output of the interpolator 41 is a series of 50 Hz 2:1 interlace format fields, corresponding to 625 lines/frame, providing high quality motion portrayal when displayed.

In the above embodiment, line standard conversion is carried out after progressive scan conversion of the input signal in the progressive scan converter 1. It will be appreciated, however, that line conversion could be carried out in the output field generator 5 by selecting the output pixel position accordingly. Alternatively, for example, line conversion could be carried out as part of the progressive scan conversion process.

Figure 12A:
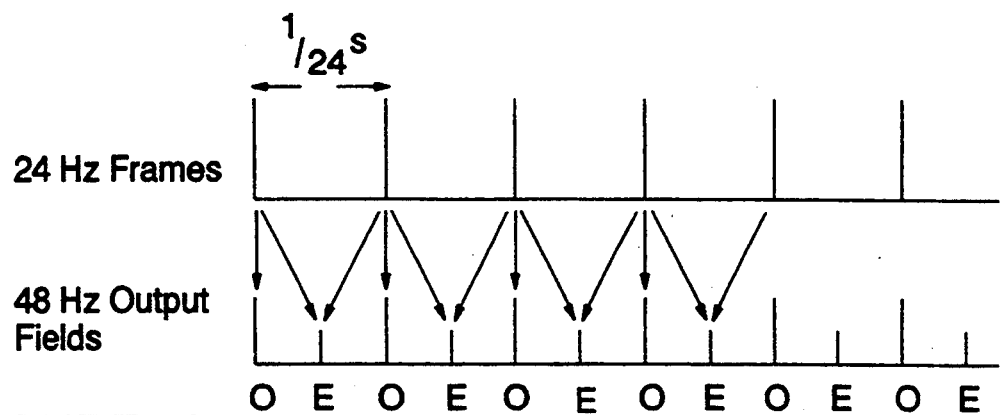
FIG. 12a illustrates one method of generating 48 Hz output fields in another mode of operation of the apparatus of FIG. 3.
Figure 12B:
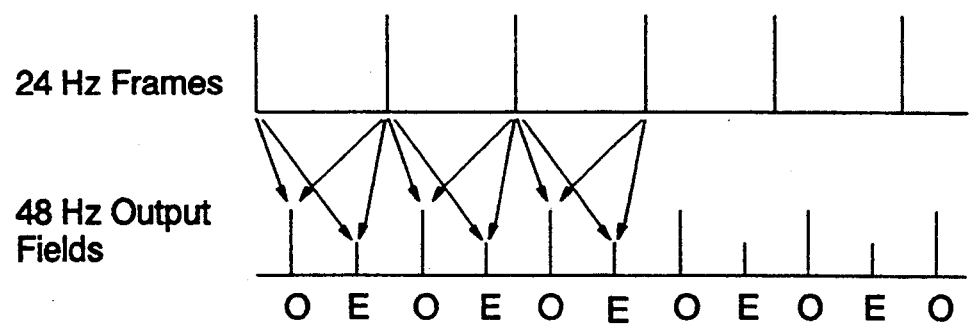
FIG. 12b illustrates a further method of generating 48 Hz output fields in a further mode of operation of the apparatus of FIG. 3.

While the above example describes the production of a 50 Hz 2:1 interlace format output signal, it will be appreciated that output signals with a different field/frame rate can be generated in a similar manner. As a particular example when converting the 60 Hz input signal for display in accordance with a 50 Hz standard, it may be acceptable to generate a 48 Hz output signal which can then be recorded and replayed at 50 Hz with a resulting 4% increase in the motion rate in the displayed image. A 48 Hz output signal could be generated using the apparatus described above simply by replacing the 50 Hz clock signal to the samplers 36 and 32 and the delay 33 in FIG. 8a with a 48 Hz signal synchronised with the 60 frames/s frames supplied to the selector 4 in FIG. 3. This would result in interpolation coefficients for successive output fields of alternately 0 and 0.5 (ie interpolation ratios of alternately 1:0 and $\frac{1}{2}:\frac{1}{2}$) as can be seen from FIG. 12a which illustrates the simple relationship between the 48 Hz output fields and the 24 Hz frames from which the output fields are to be generated. As shown in FIG. 12a, alternate output fields are temporally aligned with respective 24 Hz frames. These fields can therefore be produced directly from a 24 Hz frame by taking the alternate lines of pixels in the frame. The remaining output fields are temporally midway between two progressive scan frames and can thus be produced by combining equal proportions of pixels in the respective pairs of frames. Although this system might be acceptable for some purposes, since only alternate output fields are generated by motion compensated temporal interpolation, fluctuations in resolution between interpolated and non-interpolated fields may be noticeable in the displayed image. This is due to the effect on resolution of the interpolation process. Thus, where 48 Hz output fields are to be generated, it is preferred that the temporal positions of the output fields are offset by one quarter of the 24 Hz progressive scan frame period as illustrated in FIG. 12b. In this case, successive output fields are located alternately $\frac{1}{4}$ and $\frac{3}{4}$ of the way between the temporal positions of a pair of 24 Hz frames. Thus, the interpolation coefficients for output fields are alternately 0.25 and 0.75, and the interpolation ratios are alternately $\frac{3}{4}:\frac{1}{4}$ and $\frac{1}{4}:\frac{3}{4}$ respectively. Since all output fields are then interpolated, fluctuations in resolution when the output signal is displayed are avoided. The required temporal offset of the output field sequence by $\frac{1}{4}$ of the 24 Hz frame period can of course be achieved simply by adjusting the timing of the 48 Hz clock signal in the control logic relative to the 60 frames/s progressive scan frames supplied to the selector 4. Again, the output signal displays high quality motion portrayal.

Although illustrative embodiments of the invention have been described in detail herein with reference to the accompanying drawings, it is to be understood that the invention is not limited to those precise embodiments, and that various changes and modifications an be effected therein by one skilled in the art without departing from the scope and spirit of the invention as defined in the appended claims.

We claim:

1. A method of processing an input 60 field/s video signal generated by 3232 pulldown to produce an output video signal, the method comprising the steps of:
    producing from the input signal a series of progressive scan format frames, each frame corresponding to a respective one of the input fields;
    comparing blocks of pixels in each progressive scan frame with blocks of pixels in the following frame to derive motion vectors representing the motion of the content of respective blocks between frames;
    utilising the motion vectors to monitor the field sequence of the input signal; and
    producing fields or frames of the output video signal using input fields or progressive scan frames selected in dependence upon the field sequence of the input signal, at least some of the output fields or frames being produced by motion compensated temporal interpolation utilising said motion vectors.

2. A method as claimed in claim 1, wherein the output fields or frames are produced using selected progressive scan frames, the selected frames corresponding to one field in each group of 3 and 2 in the 3232 field sequence of the input signal.

3. A method as claimed in claim 2, wherein output fields corresponding to 50 field/s are produced by motion compensated temporal interpolation between pairs of the selected progressive scan frames.

4. A method as claimed in claim 2, wherein output fields corresponding to 48 field/s are produced, alternate output fields being produced by motion compensated temporal interpolation between pairs of the selected progressive scan frames with an interpolation ratio of $\frac{1}{2}:\frac{1}{2}$.

5. A method as claimed in claim 4, including displaying the output video signal at 50 fields/s.

6. A method as claimed in claim 2, wherein output fields corresponding to 48 field/s are produced by motion compensated temporal interpolation between pairs of the selected progressive scan frames, alternate output fields being produced with an interpolation ratio of $\frac{3}{4}:\frac{1}{4}$ and the remaining output fields being produced with an interpolation ratio of $\frac{1}{4}:\frac{3}{4}$.

7. A method as claimed in claim 6, including displaying the output video signal at 50 field/s.

8. A method as claimed in claim 1, wherein the output fields or frames are produced with a different line standard to the input signal.

9. Apparatus for processing an input 60 field/s video signal generated by 3232 pulldown to produce an output video signal, the apparatus comprising:
    means for producing from the input signal a series of progressive scan scan format frames, each frame corresponding to a respective one of the input fields;
    means for comparing blocks of pixels in each progressive frame with blocks of pixels in the following frame to derive motion vectors representing the motion of the content of respective blocks between frames;
    means for utilising the motion vectors to monitor the field sequence of the input signal; and
    means for producing fields or frames of the output video signal using input fields or progressive scan frames selected in dependence upon the field sequence of the input signal, at least some of the output fields or frames being produced by motion compensated temporal interpolation utilising said motion vectors.

* * * * *